United States Patent [19]
Arimilli et al.

[11] Patent Number: 5,659,708
[45] Date of Patent: Aug. 19, 1997

[54] CACHE COHERENCY IN A MULTIPROCESSING SYSTEM

[75] Inventors: Ravi Kumar Arimilli, Round Rock; John Michael Kaiser, Cedar Park; William Kurt Lewchuk; Michael Scott Allen, both of Austin, all of Tex.

[73] Assignee: International Business Machines Corp., Armonk, N.Y.

[21] Appl. No.: 317,256

[22] Filed: Oct. 3, 1994

[51] Int. Cl.$^6$ .................................................. G06F 12/08
[52] U.S. Cl. ............................................................ 395/473
[58] Field of Search .................................. 395/473, 468, 395/451, 482

[56] References Cited

U.S. PATENT DOCUMENTS

| | | | |
|---|---|---|---|
| 5,301,281 | 4/1994 | Kennedy | 395/307 |
| 5,388,224 | 2/1995 | Maskas | 395/284 |
| 5,504,874 | 4/1996 | Galles et al. | 395/472 |

OTHER PUBLICATIONS

Handy, "The Cache Memory Book", 1993, pp. 152–157.

*Primary Examiner*—Eddie P. Chan
*Assistant Examiner*—Kevin L. Ellis
*Attorney, Agent, or Firm*—Kelly K. Kordzik; Winstead Sechrest & Minick P.C.; Anthony V. S. England

[57] ABSTRACT

A multiprocessor system utilizing a plurality of bus devices coupled via a shared bus utilizes a specially coded signal to notify a bus device initiating a read or a read with intent to modify operation that the requested data, or cache line, is in a modified state within a cache of another bus device. Unlike the modified response signal, this special signal is sent along with the requested data from the one bus device to the requesting bus device, indicating that this data has priority over any data being sent from the memory system coupled to the shared bus. The present invention allows for cache-to-cache and cache-to-memory-and-cache operations.

26 Claims, 3 Drawing Sheets

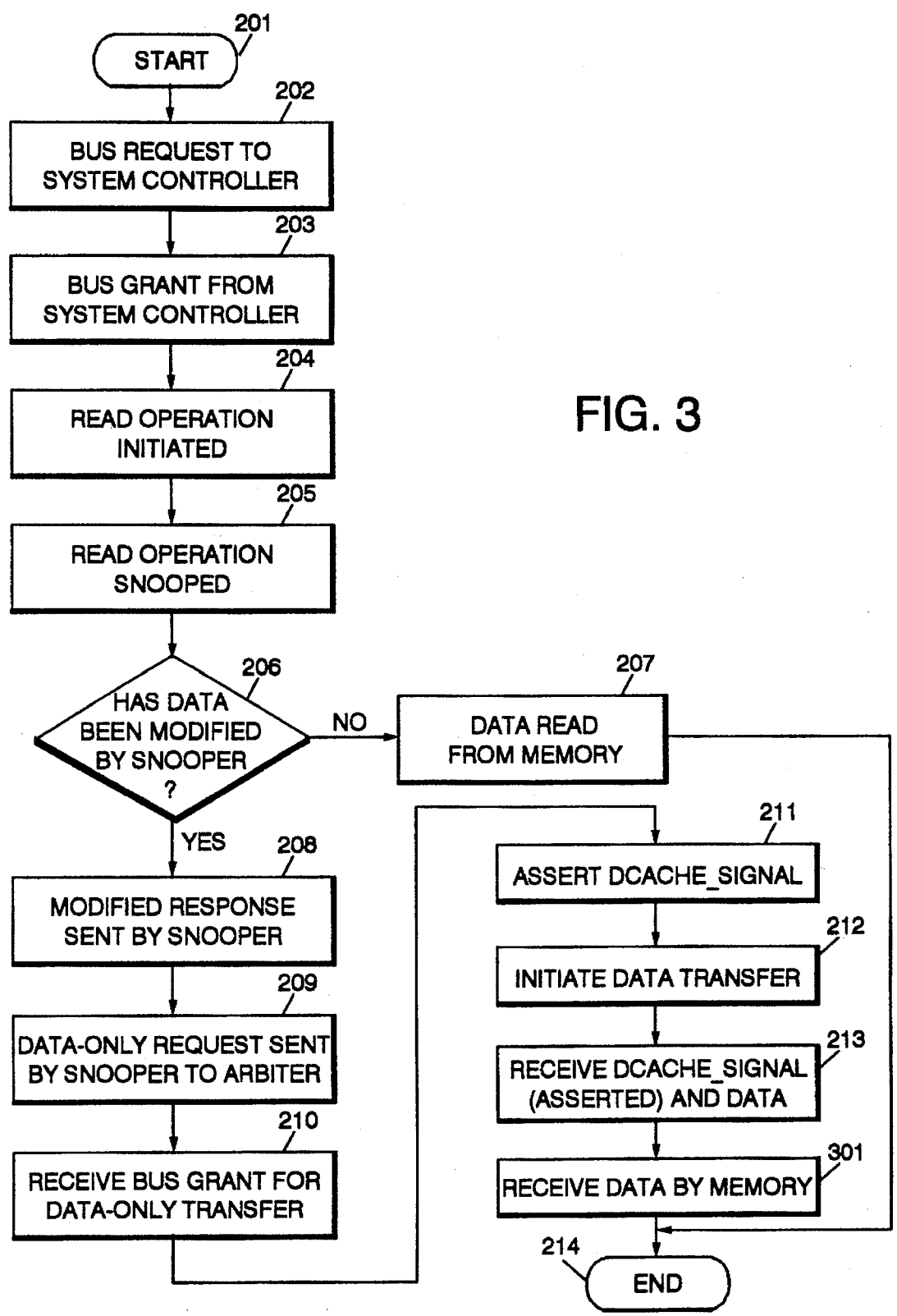

CACHE COHERENCY IN A MULTIPROCESSING SYSTEM

CROSS REFERENCE TO RELATED APPLICATIONS

This application for patent is related to the following applications for patent filed concurrently herewith:

EFFICIENT ADDRESS TRANSFER TECHNIQUE FOR A DATA PROCESSING SYSTEM, application Ser. No. 08/317,007;

DUAL LATENCY STATUS AND COHERENCY REPORTING FOR A MULTIPROCESSING SYSTEM, application Ser. No. 08/316,980;

QUEUED ARBITRATION MECHANISM FOR DATA PROCESSING SYSTEM, application Ser. No. 08/317,066;

METHOD AND APPARATUS FOR REMOTE RETRY IN A DATA PROCESSING SYSTEM, application Ser. No. 08/316,978;

ARRAY CLOCKING METHOD AND APPARATUS FOR INPUT/OUTPUT SUBSYSTEMS, application Ser. No. 08/316,976;

DATA PROCESSING SYSTEM HAVING DEMAND BASED WRITE THROUGH CACHE WITH ENFORCED ORDERING, application Ser. No. 08/316,979;

COHERENCY AND SYNCHRONIZATION MECHANISMS FOR I/O CHANNEL CONTROLLERS IN A DATA PROCESSING SYSTEM, application Ser. No. 08/316,977.

ALTERNATING DATA VALID CONTROL SIGNALS FOR HIGH PERFORMANCE DATA TRANSFER, application Ser. No. 08/326,190;

LOW LATENCY ERROR REPORTING FOR HIGH PERFORMANCE BUS, application Ser. No. 08/326,203.

Each of such cross-referenced applications are hereby incorporated by reference into this Application as though fully set forth herein.

TECHNICAL FIELD OF THE INVENTION

The present invention relates in general to data processing systems and, in particular, to the transfer of data within a coherent multiprocessor system employing snooping capabilities.

BACKGROUND OF THE INVENTION

In a data processing system utilizing a shared bus coupling multiple bus devices (e.g. processors, input/output ("I/O") channel controllers, high performance I/O devices) with a memory system, it is common practice for a bus device to read, or access a portion of data stored in the memory system and upon receiving this data, to write the data into the device's cache, i.e. fast local memory. This allows the bus device to gain quick access to this data, if required again in the near future. If the bus device needs to modify this previously accessed data, which is still present in its cache, it is also common practice to modify the cache data but not modify the data in the memory system. However, if another bus device requires access to this portion of data, then retrieval of that data from the memory system will result in a retrieval of an "old" version of the data, since the most current version of the data is modified in the other bus device's cache. This is known in the art as "cache inconsistency."

Prior data processing systems have employed "snooping" capabilities within the bus devices in order to alleviate this problem. "Snooping" bus devices monitor addresses delivered on the shared bus by other bus devices, and compare these monitored addresses to addresses of data currently held within their internal or attached caches. (Snooping is well-known in the art.) For example, if a first bus device invokes a read operation on the shared bus, a second bus device will snoop the address of the data to be read from the memory system and compare the address to addresses of data currently held in the second bus device's cache. If the second bus device currently holds that addressed data, whether in an unmodified or modified form, it may then signal the first bus device of the situation.

A common method of alleviating the previously described cache inconsistency between modified data in a cache and the memory system data is to have the snooper issue a "retry" response to the device that initiated the bus read operation. This, then cancels the memory read operation and the snooper would in turn arbitrate for the system bus and issue a bus write operation to update the memory system with the valid cache data. The snooper would continuously retry the bus read operation until the bus write operation has been completed by the snooper.

Another more efficient method is to have the snooper which retried the read operation to provide the data within a deterministic "data intervention" window after the retry/null response window. (Data intervention is well known in the art.) This requires that the memory system provide read data (due to a null response) after the data intervention window. This then allows the snooper to retry, at least once, the bus read operation, access the modified cache data, and upon receiving another read operation, respond null and provide the data in the data intervention window.

However, the aforementioned technique limits the memory system from providing data prior to the data intervention window. Furthermore, the snooper may retry the bus read operation several times before providing the read data, thus inefficiently utilizing the system bus bandwidth.

Thus, there is a need in the art for a more efficient technique for transferring data to a requesting bus device when the requested data has been modified by another bus device.

SUMMARY OF THE INVENTION

It is an object of the present invention to more efficiently transfer modified data from one bus device to another bus device over a shared bus when the requesting bus device has initiated a "read" operation.

This invention describes a mechanism to allow data intervention (cache-to-cache and cache-to-memory-and-cache operations) on a shared bus in a high-performance manner. Two types of bus operations utilize and benefit from this special mechanism: bus Read operations and bus Read-With-Intent-to-Modify ("RWITM") operations. A special DCACHE_ signal is defined, which allows bus Read or RWITM requester's to determine if the data currently on the bus is sent from the memory system or from an intervening cache.

If a bus device initiates a bus Read or RWITM, and that operation hits on a snooper's cache, and that cache line contains the only valid version of the data, the snooper responds to the address with a "Modified" response code, and, in parallel, prepares to initiate a data-only transfer. The Modified response code informs the requesting bus device that the requested data has been modified. The Read or RWITM requester, upon receiving the Modified response, will only accept data from the intervening snooper; it will ignore data sent by the memory system. The DCACHE__ signal, valid in the first cycle of the data-only transfer, indicates whether this data transfer is the valid data from the intervening snooper (asserted), or the invalid data from the memory system (negated). Data marked by the DCACHE__ signal asserted always takes priority over data from the memory system. This rule allows the intervening cache to start the data transfer even before the Modified response has been received by the requester.

When the snooper has the data ready to transfer, it initiates a special data-only request code to the system arbiter (system controller). When granted the data bus by the arbiter, the snooper initiates the data transfer, and asserts the DCACHE__ signal in the first cycle of the data transfer to indicate to the waiting device that this is the correct data. Note that the snooper can transfer the data before, in parallel with, or after driving the Modified snoop response.

The memory system will not participate in a transaction wherein a snooper has responded modified to a RWITM operation since at least some of the data transferred to the requesting device will probably again be modified. Since the memory system does not need to consume the intervention data in this case, the result is a cache-to-cache transfer of data.

If the snooper performs the same data-only transfer in response to a bus Read operation, the memory system, like the Read requester, may also be a consumer of the intervention data from the snooper. This results in a cache-to-memory-and-cache transfer of data. This requires that the memory system have the capability of handling the (data-only) write operation from the snooper when the initial operation was a Read.

In either case, the DCACHE__ signal, as compared to the alternative retry mechanisms, significantly reduces data intervention latency as seen by the Read or RWITM requester. Furthermore, the memory latency is also significantly reduced, since the memory system may provide the read data, any time after the Read or RWITM request, independent of the retry/modify/null response window or data intervention window. Also, the address bus is only used once for the operation, improving realizable address bus bandwidth relative to a system employing the retry mechanism.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 illustrates a flow diagram of an operation of the present invention with respect to a read operation.

DETAILED DESCRIPTION OF A PREFERRED EMBODIMENT OF THE INVENTION

With the foregoing hardware in mind, it is possible to explain the process-related features of the present invention.

To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
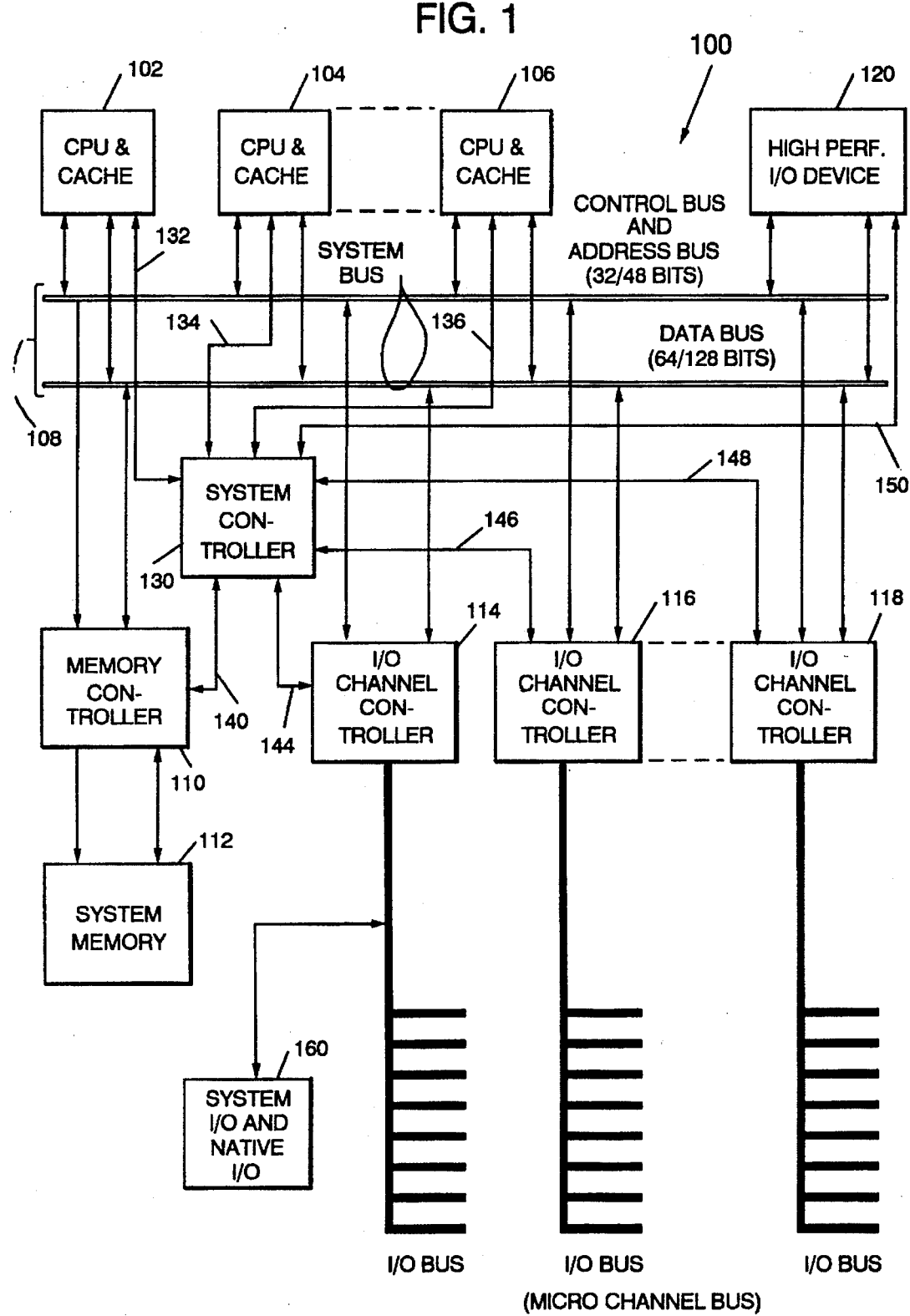
FIG. 1 illustrates a block diagram of a system implementing a preferred embodiment of the present invention.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102–120, inclusive, operate under the control of system controller 130 which communicates with each unit connected to the system bus 108 by point to point lines such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

Figure 2:
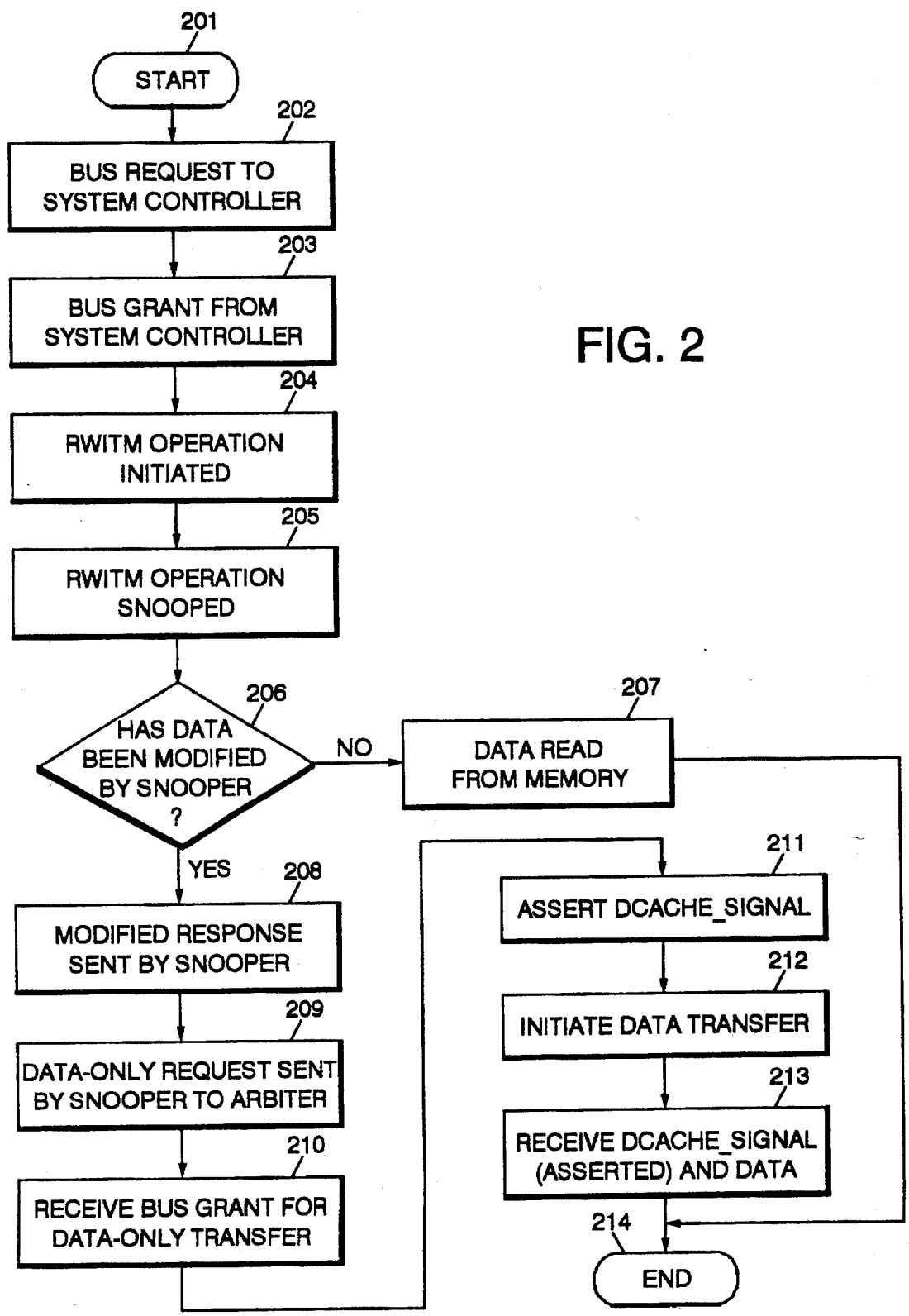
FIG. 2 illustrates a flow diagram of an operation of the present invention with respect to RWITM operations.

Referring next to FIG. 2, them is illustrated a flow diagram representing a preferred implementation of the present invention with respect to a RWITM operation. Such an operation is initiated by a bus device when it desires to read and modify a data portion from system memory 112. The process begins in step 201 and proceeds to step 202 wherein one of the bus devices, such as processor 102 initiates a bus request over connection 132 to system controller 130. System controller 130 will then implement various arbitration processes with an internal arbiter in order to allocate access to bus 108 to the various bus devices within system 100. A description of such an arbitration mechanism is described in cross-referenced, co-pending U.S. patent application Ser. No. 08/317,006, which is hereby incorporated by reference herein.

Once system controller 130 has determined that processor 102 is to obtain access to bus 108, system controller 130 will issue a bus grant to processor 102 via control line 132. Thereafter, in step 204, processor 102 may initiate a RWITM operation, with an intent to read a cache line, or portion of data, stored within system memory 112.

In step 205, each of the other bus devices in system 100 (processors 104 and 106, high performance I/O device 120 and I/O channel controllers 114, 116 and 118) will then snoop the address accompanying the RWITM operation from processor 102 and placed upon bus 108. Each of these bus devices, in step 206, will then determine whether or not that particular address matches an address pertaining to a copy of data stored within their internal memories, or caches. If none of the bus devices obtains an address match, the process proceeds to step 207, wherein the addressed data is read from system memory 112. However, if one of the bus devices does obtain a match of the address and determines that a portion of that data has been modified by the bus device, then the process proceeds to step 208. If, for example, processor 106 has determined that a modified version of the requested data is contained within its internal cache, then processor 106 will send a Modified response to processor 102.

In order to maximize the number of bus attachments and bus frequency, and yet allow attachment to the bus directly with CMOS logic devices, the various status and coherency responses from the bus devices are driven uni-directionally from each bus participant to a common collection point, usually in system controller 130, which combines all the responses and then returns the combined responses to each requesting bus device. Additionally, the combining logic also prioritizes the responses, since bus devices may be signalling different responses. These prioritizations are noted within the tables described herein.

The values for the coherency response window are encoded and prioritized as shown below in a preferred embodiment.

TABLE B

| Encoded Snoop (Coherency) Message | Priority | Definition |
| --- | --- | --- |
| 000 | | Reserved |
| 001 | | Reserved |
| 010 | | Reserved |
| 011 | 3 | Rerun |
| 100 | 1 | Retry |
| 101 | 2 | Modified |
| 110 | 4 | Shared |
| 111 | 5 | Null or Clean (Not Modified or Shared) |

In Table B, the Rerun response is used to extend the coherency response when leaving the local bus. The Retry response is used to indicate a coherency collision and that the operation should be resent later by the requesting device. The Modified response is used to indicate to the requesting device that a modified cache line exists in an enclosed cache within one of the bus devices. A Shared response indicates that the data exists in one or more caches, but is not modified.

In parallel (or before or after) with sending of the Modified response, processor 106 will send via line 136 to system controller 130 a data-only request. Upon determining that processor 106 is to be grated the data bus, in step 210, system controller 130 will issue a data bus grant to processor 106 for the data only transfer. Thereafter, in step 211, processor 106 will assert the DCACHE_signal, and in step 212, send the data along with the DCACHE_signal over bus 108 to processor 102. One skilled in the art will be able to implement the DCACHE_signal by merely asserting it the first cycle of the data transfer.

In step 213, processor 102 will receive the asserted DCACHE_signal along with the modified version of the data from processor 106. Processor 102 will know to accept this data from processor 106, since it is headed by the asserted DCACHE_signal. Thus, processor 102 will ignore any other data received from any other bus device and system memory 112. Again, one skilled in the art will be able to design logic circuitry in order to implement such a process. The overall process thus ends at step 214.

Referring next to FIG. 3, there is illustrated a flow diagram of an implementation of the present invention with respect to a read operation initiated by processor 102. All of the steps illustrated in FIG. 3 are the same as in FIG. 2, except that steps 204 and 205 indicate that a read operation is being employed instead of a RWITM operation, and step 301 has been added between steps 213 and 214, wherein the data being transferred from processor 106 to processor 102 is also received and stored within system memory 112, since processor 102 merely intends to read the modified version of the data, and is not intending to modify that data. This step 301 is implemented since system memory 112 needs to have the most recent version of the requested data. This operation is known as a cache-to-memory-and-cache transfer of data.

Although the present invention and its advantages have been described in detail, it should be understood that various changes, substitutions and alterations can be made herein without departing from the spirit and scope of the invention as defined by the appended claims.

What is claimed is:

1. In a data processing system including a plurality of bus devices coupled through a bus architecture with a memory device, a method comprising the steps of:

issuing a read operation onto said bus architecture, said read operation issued by a first one of said plurality of bus devices, said read operation configured to read a data portion from said memory device;

snooping of said read operation by a second one of said plurality of bus devices;

determining, by said second one of said plurality of bus devices, if a modified copy of said data portion is contained within said second one of said plurality of bus devices;

sending, from said second one of said plurality of bus devices to said first one of said plurality of bus devices when said second one of said plurality of bus device determines that said modified copy of said data portion is contained within said second one of said plurality of bus devices, a signal that causes said first one of said plurality of bus devices to ignore any other version of said data portion received by said first one of said plurality of bus devices from said memory device; and sending a message, from said second one of said plurality of bus devices to said first one of said plurality of bus devices when said second one of said plurality of bus devices determines that said modified copy of said data portion is contained within said second one of said plurality of bus devices, indicating that said modified copy of said data portion is contained within said second one of said plurality of bus devices, said message sent in parallel with said signal.

2. The method as recited in claim 1, further comprising the step of:

sending a copy of said modified copy of said data portion from said second one of said plurality of bus devices to a cache of said first one of said plurality of bus device, said copy of said modified copy of said data portion following said signal.

3. The method as recited in claim 2, further comprising the step of:

receiving, by said first one of said plurality of bus devices, said copy of said modified copy of said data portion, wherein receipt, by said first one of said plurality of bus devices, of said copy of said modified copy of said data portion takes priority over receipt of said data portion from said memory device.

4. The method as recited in claim 3, further comprising the step of:

ignoring, by said first one of said plurality of bus devices, said data portion received from said memory device.

5. The method as recited in claim 2, wherein said data processing system further includes a system controller coupled point-to-point to each of said bus devices, and wherein said step of sending said copy of said modified copy of said data portion from said second one of said plurality of bus devices to said first one of said plurality of bus devices further comprises the steps of:

transmitting, from said second one of said plurality of bus devices to said system controller, a data-only bus request; and returning, from said system controller to said second one of said plurality of bus devices, a bus grant in response to said data-only bus request, said transmitting and said returning steps occurring before said step of sending said copy of said modified copy of said data portion from said second one of said plurality of bus devices to said first one of said plurality of bus devices.

6. The method as recited in claim 2, further comprising the step of:

sending said copy of said modified copy of said data portion from said second one of said plurality of bus devices to said memory device.

7. The method as recited in claim 1, wherein said read operation is a read-with-intent-to-modify operation.

8. The method as recited in claim 1, wherein said copy of said modified copy of said data portion is received by said first one of said plurality of bus devices from said second one of said plurality of bus devices with said signal before said message is received by said first one of said plurality of bus devices.

9. The method as recited in claim 8, wherein said first one of said plurality of bus devices does not accept said copy of said modified copy of said data portion received from said second one of said plurality of bus devices if said signal is not asserted.

10. The method as recited in claim 8, wherein said first one of said plurality of bus devices will accept said copy of said modified copy of said data portion if said signal is asserted even though said message has not yet been received by said first one of said plurality of bus devices.

11. A data processing system, comprising:

a plurality of bus devices;

a bus configured in a predetermined architecture;

a memory device, wherein said bus couples said plurality of bus devices and said memory device, wherein said plurality of bus devices comprises one or more processors;

means, coupled to a first one of said plurality of bus devices, for issuing a read operation onto said bus architecture, said read operation issued by said first one of said plurality of bus devices, said read operation configured to read a data portion from said memory device;

means, coupled to a second one of said plurality of bus devices, for snooping of said read operation by said second one of said plurality of bus devices;

means, coupled to said second one of said plurality of bus devices, for determining, by said second one of said plurality of bus devices, if a modified copy of said data portion is contained within said second one of said plurality of bus devices;

means, coupled to said second one of said plurality of bus devices, for sending, from said second one of said plurality of bus devices to said first one of said plurality of bus devices when said second one of said plurality of bus devices determines that said modified copy of said data portion is contained within said second one of said plurality of bus devices, a signal that causes said first one of said plurality of bus devices to ignore any other version of said data portion received by said first one of said plurality of bus devices from said memory device; and means, coupled to said second one of said plurality of bus devices, for sending a message, from said second one of said plurality of bus devices to said first one of said plurality of bus devices when said second one of said plurality of bus devices determines that said modified copy of said data portion is contained within said second one of said plurality of bus devices, indicating that said modified copy of said data portion is contained within said second one of said plurality of bus devices, said message sent in parallel with said signal.

12. The system as recited in claim 11, comprising:

means, coupled to said second one of said plurality of bus devices, for sending a copy of said modified copy of said data portion from a cache of said second one of said plurality of bus devices to a cache of said first one of said plurality of bus devices, said copy of said modified of said data portion following said signal.

13. The system as recited in claim 12, further comprising:

means for receiving, by said first one of said plurality of bus devices, said copy of said modified copy of said data portion, wherein receipt, by said first one of said plurality of bus devices, of said copy of said modified copy of said data portion takes priority over receipt of said data portion from said memory device.

14. The system as recited in claim 13, further comprising:

means for ignoring, by said first one of said plurality of bus devices, said data portion received from said memory device.

15. The system as recited in claim 11, wherein said read operation is a read-with-intent-to-modify operation.

16. The system as recited in claim 11, wherein said plurality of bus devices further includes one or more I/O channel controllers coupled to an I/O bus, and wherein said memory device includes a memory controller coupled to a storage device.

17. In a data processing system including a plurality of bus devices coupled through a bus architecture with a memory device, a method comprising the steps of:

issuing a read operation onto said bus architecture, said read operation issued by a first one of said plurality of bus devices, said read operation configured to read a data portion from said memory device:

snooping of said read operation by a second one of said plurality of bus devices;

determining, by said second one of said plurality of bus devices, if a modified copy of said data portion is contained within said second one of said plurality of bus devices; and sending, from said second one of said plurality of bus devices to said first one of said plurality of bus devices when said second one of said plurality of bus device determines that said modified copy of said data portion is contained within said second one of said plurality of bus devices, a signal that causes said first one of said plurality of bus devices to ignore any other version of said data portion received by said first one of said plurality of bus devices from said memory device, wherein said data processing system further includes a system controller coupled point-to-point with each of said bus devices, further comprising the steps of:

transmitting a bus request for said read operation by said first one of said plurality of bus devices to said system controller; and returning, from said system controller to said first one of said plurality of bus devices, a bus grant for said read operation in response to said bus request, said transmitting and said returning steps occurring before said issuing step.

18. A data processing system, comprising:

a plurality of bus devices;

a bus configured in a predetermined architecture;

a memory device, wherein said bus couples said plurality of bus devices and said memory device, wherein said plurality of bus devices comprises one or more processors;

means, coupled to a first one of said plurality of bus devices, for issuing a read operation onto said bus architecture, said read operation issued by said first one of said plurality of bus devices, said read operation configured to read a data portion from said memory device;

means, coupled to a second one of said plurality of bus devices, for snooping of said read operation by said second one of said plurality of bus devices;

means, coupled to said second one of said plurality of bus devices, for determining, by said second one of said plurality of bus devices, if a modified copy of said data portion is contained within said second one of said plurality of bus devices; and means, coupled to said second one of said plurality of bus devices, for sending, from said second one of said plurality of bus devices to said first one of said plurality of bus devices when said second one of said plurality of bus devices determines that said modified copy of said data portion is contained within said second one of said plurality of bus devices, a signal that causes said first one of said plurality of bus devices to ignore any other version of said data portion received by said first one of said plurality of bus devices from said memory device, wherein said data processing system further includes a system controller coupled point-to-point with each of said bus devices, further comprising:

means, coupled to said first one of said plurality of bus devices, for transmitting a bus request for said read operation by said first one of said plurality of bus devices to said system controller; and means, coupled to said system controller, for returning, from said system controller to said first one of said plurality of bus devices, a bus grant for said read operation in response to said bus request.

19. A data processing system, comprising:

a plurality of bus devices;

a bus configured in a predetermined architecture;

a memory device, wherein said bus couples said plurality of bus devices and said memory device, wherein said plurality of bus devices comprises one or more processors;

means, coupled to a first one of said plurality of bus devices, for issuing a read operation onto said bus architecture, said read operation issued by said first one of said plurality of bus devices, said read operation configured to read a data portion from said memory device;

means, coupled to a second one of said plurality of bus devices, for snooping of said read operation by said second one of said plurality of bus devices;

means, coupled to said second one of said plurality of bus devices, for determining, by said second one of said plurality of bus devices, if a modified copy of said data portion is contained within said second one of said plurality of bus devices;

means, coupled to said second one of said plurality of bus devices, for sending, from said second one of said plurality of bus devices to said first one of said plurality of bus devices when said second one of said plurality of bus devices determines that said modified copy of said data portion is contained within said second one of said plurality of bus devices, a signal that causes said first one of said plurality of bus devices to ignore any other version of said data portion received by said first one of said plurality of bus devices from said memory device;

means, coupled to said second one of said plurality of bus devices, for sending a message, from said second one of said plurality of bus devices to said first one of said plurality of bus devices when said second one of said plurality of bus devices determines that said modified copy of said data portion is contained within said second one of said plurality of bus devices, indicating that said modified copy of said data portion is contained within said second one of said plurality of bus devices, said message sent in parallel with said signal; and means, coupled to said second one of said plurality of bus devices, for sending said copy of said modified copy of said data portion from a cache of said second one of said plurality of bus devices to a cache of said first one of said plurality of bus devices, said copy of said modified copy of said data portion following said signal indicating that data being sent is a copy of said modified copy of said data portion, wherein said data processing system further includes a system controller coupled point-to-point to each of said bus devices, and wherein said means for sending of said copy of said modified copy of said data portion from said second one of said plurality of bus devices to said first one of said plurality of bus devices further comprises:

means for transmitting, from said second one of said plurality of bus devices to said system controller, a data-only bus request; and means for returning, from said system controller to said second one of said plurality of bus devices, a bus grant in response to said data-only bus request.

20. A data processing system, comprising:

a plurality of bus devices;

a bus configured in a predetermined architecture;

a memory device, wherein said bus couples said plurality of bus devices and said memory device, wherein said plurality of bus devices comprises one or more processors;

means, coupled to a first one of said plurality of bus devices, for issuing a read operation onto said bus architecture, said read operation issued by said first one of said plurality of bus devices, said read operation configured to read a data portion from said memory device;

means, coupled to a second one of said plurality of bus devices, for snooping of said read operation by said second one of said plurality of bus devices;

means, coupled to said second one of said plurality of bus devices, for determining, by said second one of said plurality of bus devices, if a modified copy of said data portion is contained within said second one of said plurality of bus devices;

means, coupled to said second one of said plurality of bus devices, for sending, from said second one of said plurality of bus devices to said first one of said plurality of bus devices when said second one of said plurality of bus devices determines that said modified copy of said data portion is contained within said second one of said plurality of bus devices, a signal that causes said first one of said plurality of bus devices to ignore any other version of said data portion received by said first one of said plurality of bus devices from said memory device;

means, coupled to said second one of said plurality of bus devices, for sending a message, from said second one of said plurality of bus devices to said first one of said plurality of bus devices when said second one of said plurality of bus devices determines that said modified copy of said data portion is contained within said second one of said plurality of bus devices, indicating that said modified copy of said data portion is contained within said second one of said plurality of bus devices, said message sent in parallel with said signal; and means, coupled to said second one of said plurality of bus devices, for sending said copy of said modified copy of said data portion from a cache of said second one of said plurality of bus devices to a cache of said first one of said plurality of bus devices, said copy of said modified copy of said data portion following said signal indicating that data being sent is a copy of said modified copy of said data portion, further comprising:

means, coupled to said second one of said plurality of bus devices, for sending said copy of said modified copy of said data portion from said second one of said plurality of bus devices to said memory device.

21. In a data processing system including a plurality of bus devices coupled through a bus architecture with a memory device, and a system controller coupled point-to-point with each of said bus devices, wherein each of said plurality of bus devices includes a cache, a method comprising the steps of:

transmitting a bus request for a read operation by a first one of said plurality of bus devices to said system controller;

returning, from said system controller to said first one of said plurality of bus devices, a bus grant for said read operation in response to said bus request;

issuing a read operation onto said bus architecture, said read operation issued by said first one of said plurality of bus devices, said read operation configured to read a data portion from said memory device;

snooping of said read operation by a second one of said plurality of bus devices;

determining, by said second one of said plurality of bus devices, if a modified copy of said data portion is contained within a cache of said second one of said plurality of bus devices;

sending a message, from said second one of said plurality of bus devices to said first one of said plurality of bus devices when said second one of said plurality of bus devices determines that said modified copy of said data portion is contained within said second one of said plurality of bus devices, indicating that said modified copy of said data portion is contained within said second one of said plurality of bus devices;

transmitting, from said second one of said plurality of bus devices to said system controller, a data-only bus request;

returning, from said system controller to said second one of said plurality of bus devices, a bus grant in response to said data-only bus request;

sending, from said second one of said plurality of bus devices to said first one of said plurality of bus devices when said second one of said plurality of bus devices determines that said modified copy of said data portion is contained within said second one of said plurality of bus devices, a signal that causes said first one of said plurality of bus devices to ignore any other version of said data portion received by said first one of said plurality of bus devices from said memory device;

sending said copy of said modified copy of said data portion from said second one of said plurality of bus devices to a cache of said first one of said plurality of bus devices, said copy of said modified copy of said data portion following said signal, said transmitting and said remaining steps occurring before said step of sending said copy of said modified copy of said data portion from said second one of said plurality of bus devices to said first one of said plurality of bus devices; and receiving, by said first one of said plurality of bus devices, said copy of said modified copy of said data portion, wherein receipt, by said first one of said plurality of bus devices, of said copy of said modified copy of said data portion takes priority over receipt of said data portion from said memory device.

22. In a data processing system including a plurality of bus devices coupled through a bus architecture with a memory device, a method comprising the steps of:

issuing a read operation onto said bus architecture, said read operation issued by a first one of said plurality of bus devices, said read operation configured to read a data portion from said memory device;

snooping of said read operation by a second one of said plurality of bus devices; and determining, by said second one of said plurality of bus devices, if a modified copy of said data portion is contained within said second one of said plurality of bus devices;

sending, from said second one of said plurality of bus devices to said first one of said plurality of bus devices when said second one of said plurality of bus device determines that said modified copy of said data portion is contained within said second one of said plurality of bus devices, a signal that causes said first one of said plurality of bus devices to ignore any other version of said data portion received by said first one of said plurality of bus devices from said memory device, wherein said first one of said plurality of bus devices ignores any data not accompanied by said signal.

23. The method as recited in claim 22, wherein said any data is received before said copy of said modified copy of said data portion accompanied by said signal.

24. A data processing system, comprising:
a plurality of bus devices;
a bus configured in a predetermined architecture;
a memory device, wherein said bus couples said plurality of bus devices and said memory device, wherein said plurality of bus devices comprises one or more processors;

means, coupled to a first one of said plurality of bus devices, for issuing a read operation onto said bus architecture, said read operation issued by said first one of said plurality of bus devices, said read operation configured to read a data portion from said memory device;

means, coupled to a second one of said plurality of bus devices, for snooping of said read operation by said second one of said plurality of bus devices;

means, coupled to said second one of said plurality of bus devices, for determining, by said second one of said plurality of bus devices, if a modified copy of said data portion is contained within said second one of said plurality of bus devices; and means, coupled to said second one of said plurality of bus devices, for sending, from said second one of said plurality of bus devices to said first one of said plurality of bus devices when said second one of said plurality of bus devices determines that said modified copy of said data portion is contained within said second one of said plurality of bus devices, a signal that causes said first one of said plurality of bus devices to ignore any other version of said data portion received by said first one of said plurality of bus devices from said memory device, wherein said first one of said plurality of bus devices ignores any data not accompanied by said signal.

25. The system as recited in claim 24, wherein said any data is received before said data portion with said signal.

26. A data processing system, comprising:

a plurality of bus devices, wherein said plurality of bus devices comprises one or more processors;

a memory device;

a bus connecting said plurality of bus devices and said memory device;

circuitry in a first one of said plurality of bus devices for issuing a read operation onto said bus, said read operation issued by said first one of said plurality of bus devices, said read operation configured to read a data portion from said memory device;

circuitry in a second one of said plurality of bus devices for snooping of said read operation by said second one of said plurality of bus devices;

circuitry in said second one of said plurality of bus devices for determining, by said second one of said plurality of bus devices, if a modified copy of said data portion is contained within said second one of said plurality of bus devices;

circuitry in said second one of said plurality of bus devices for sending a message, from said second one of said plurality of bus devices onto said bus, indicating that said modified copy of said data portion is contained within said second one of said plurality of bus devices;

circuitry in said second one of said plurality of bus devices for sending said copy of said modified copy of said data portion from a cache of said second one of said plurality of bus devices to a cache of said first one of said plurality of bus devices, along with a bit indicating whether said copy of said modified copy of said data portion is a latest copy of said data portion;

circuitry for sending said data portion from said memory device to said first one of said plurality of bus devices;

circuitry in said first one of said plurality of bus devices for not accepting said data portion received from said memory device if said bit accompanying said data portion from said memory device is not asserted; and circuitry in said first one of said plurality of bus devices for accepting said copy of said modified copy of said data portion from said second one of said plurality of bus devices if said bit accompanying said copy is asserted even if said message has not yet been received by said first one of said plurality of bus devices.

* * * * *

UNITED STATES PATENT AND TRADEMARK OFFICE
CERTIFICATE OF CORRECTION

PATENT NO. : 5,659,708
DATED : August 19, 1997
INVENTOR(S) : Arimilli et al.

It is certified that error appears in the above-indentified patent and that said Letters Patent is hereby corrected as shown below:

Title page, [73] Assignee should read --International Business Machines Corporation, Armonk, N.Y. and Motorola, Incorporated, Schaumberg, IL.--.

Signed and Sealed this

Fifteenth Day of December, 1998

Attest:

BRUCE LEHMAN

Attesting Officer     Commissioner of Patents and Trademarks